(12) United States Patent
Tseng (10) Patent No.: US 11,254,162 B1
(45) Date of Patent: Feb. 22, 2022

(54) TIRE ASSEMBLY AND DISASSEMBLY AUXILIARY DEVICE

(71) Applicant: Chuan Jiing Enterprise Co., Ltd., Taichung (TW)

(72) Inventor: Tien Tsai Tseng, Taichung (TW)

(73) Assignee: Chuan Jiing Enterprise Co., Ltd., Taichung (TW)

( * ) Notice: Subject to any disclaimer, the term of this patent is extended or adjusted under 35 U.S.C. 154(b) by 0 days.

(21) Appl. No.: 17/101,486

(22) Filed: Nov. 23, 2020

(51) Int. Cl.
*B60B 30/10* (2006.01)
*B60B 30/02* (2006.01)
*B62B 5/06* (2006.01)
*B62B 1/26* (2006.01)

(52) U.S. Cl.
CPC .............. *B60B 30/10* (2013.01); *B60B 30/02* (2013.01); *B62B 1/264* (2013.01); *B62B 5/064* (2013.01); *B62B 2202/031* (2013.01)

(58) Field of Classification Search
CPC ......... B60B 30/10; B60B 30/02; B62B 1/264; B62B 5/064; B62B 2202/031
See application file for complete search history.

(56) References Cited

U.S. PATENT DOCUMENTS

| | | | | |
|---|---|---|---|---|
| 2,410,902 A | * | 11/1946 | Roberts | B60B 29/002 414/428 |
| 2,471,051 A | * | 5/1949 | Tway | B60B 29/002 414/426 |
| 2,670,092 A | * | 2/1954 | Whitesell | B60B 29/002 414/426 |
| 2,833,549 A | * | 5/1958 | Burch | B60B 33/0071 280/43.2 |
| 3,951,287 A | * | 4/1976 | Cofer | B60B 29/002 414/427 |
| 4,854,803 A | * | 8/1989 | Coccaro | B60B 29/002 414/429 |
| 5,732,960 A | * | 3/1998 | Elam | B60B 29/002 254/113 |
| 7,097,406 B1 | * | 8/2006 | Gang | B60B 29/002 254/105 |

(Continued)

FOREIGN PATENT DOCUMENTS

| | | | | |
|---|---|---|---|---|
| AU | 2008101096 A4 | * | 12/2008 | ............. B62B 3/104 |
| CA | 1287041 C | * | 7/1991 | ........... B60B 29/002 |

(Continued)

*Primary Examiner* — Jacob B Meyer
(74) *Attorney, Agent, or Firm* — Bradley J. Thorson; DeWitt LLP (57) ABSTRACT

A tire assembly and disassembly auxiliary device includes a base frame for loading a tire and a handle. The base frame includes a main bar member and two branch bar members. The main bar member is pivotally connected with a joint member. Each of the branch bar members has a front shaft seat at an end, a rear shaft seat having a rear wheel at an opposite end and a rotatable roller between the front shaft seat and the rear shaft seat. The rear shaft seat has a connecting member capable of movably connecting to the main bar member and being fixed to the main bar member through a positioning member. The handle connects with the joint member so as to pivot relative to the main bar member. A restricting member selectively connects with the handle and the main bar member in order to fix the handle.

11 Claims, 10 Drawing Sheets

(56) References Cited

U.S. PATENT DOCUMENTS

| | | | | |
|---|---|---|---|---|
| 7,740,439 | B1* | 6/2010 | Browning | B66F 3/00 414/428 |
| 8,910,957 | B1* | 12/2014 | Hassell | B60B 30/10 280/79.4 |
| 10,226,964 | B2* | 3/2019 | Rucchetto | B60B 29/001 |
| 10,632,787 | B1* | 4/2020 | Goetsch | B62B 1/10 |
| 2004/0150195 | A1* | 8/2004 | Robberson | B62B 1/12 280/652 |
| 2005/0254923 | A1* | 11/2005 | Gorski | B66F 9/148 414/426 |
| 2006/0151248 | A1* | 7/2006 | Rodriguez | B62B 5/0438 187/222 |
| 2007/0286713 | A1* | 12/2007 | Giese | B60B 29/002 414/427 |
| 2008/0101898 | A1* | 5/2008 | Hernandez | B66F 7/0641 414/426 |
| 2015/0290972 | A1* | 10/2015 | Minor | B60B 29/002 254/4 B |
| 2016/0251205 | A1* | 9/2016 | Yaschur | B66F 7/246 254/133 R |
| 2017/0066286 | A1* | 3/2017 | Rucchetto | B60B 29/001 |
| 2017/0217743 | A1* | 8/2017 | Mathieson | B60B 30/02 |
| 2017/0232793 | A1* | 8/2017 | Ang | B66F 5/04 414/426 |
| 2020/0307664 | A1* | 10/2020 | Song | B62B 5/066 |
| 2020/0370706 | A1* | 11/2020 | Gaines | F16M 11/42 |
| 2021/0053204 | A1* | 2/2021 | Graves | B25H 1/0042 |
| 2021/0252911 | A1* | 8/2021 | Combs | B60B 29/002 |

FOREIGN PATENT DOCUMENTS

| | | | | |
|---|---|---|---|---|
| CN | 201553588 | U * | 8/2010 | |
| CN | 108394436 | A * | 8/2018 | |
| DE | 202017103759 | U1 * | 8/2017 | B60B 29/002 |
| DE | 202020106854 | U1 * | 12/2020 | B62B 3/104 |
| FR | 2589399 | A1 * | 5/1987 | B60B 29/002 |
| FR | 2845639 | A1 * | 4/2004 | B60B 29/002 |
| FR | 2889108 | A1 * | 2/2007 | B60B 29/002 |
| FR | 2901225 | A1 * | 11/2007 | B60B 29/002 |
| FR | 3099453 | A1 * | 2/2021 | B62B 3/104 |
| JP | H0891006 | A * | 4/1996 | |
| JP | H11301203 | A * | 11/1999 | |
| JP | H08132807 | A * | 8/2018 | |
| KR | 200177148 | Y1 * | 4/2000 | |
| WO | WO-9007432 | A1 * | 7/1990 | B60B 29/002 |
| WO | WO-2009056168 | A1 * | 5/2009 | B60B 29/002 |
| WO | WO-2010000018 | A1 * | 1/2010 | B65D 85/06 |

* cited by examiner

TIRE ASSEMBLY AND DISASSEMBLY AUXILIARY DEVICE

BACKGROUND OF THE INVENTION

1. Technical Field

The present invention relates to an auxiliary device for tire assembly and disassembly and more particularly to a dolly for moving tires.

2. Description of Related Art

A dolly is usually used to transport tires due to large volume and heavy weight of the tires. A conventional device disclosed in U.S. Pat. No. 7,740,439 includes a base frame and a handle. After tires are loaded on the base frame, user may lift the base frame with the tires effortlessly by pulling the handle for tire assembly.

The patented device mentioned above is only suitable to lift the tire in place. However, it is not convenient to grasp and pull the handle for tire transportation since the handle extending forwardly from the base frame is close to the ground. On the other hand, the handle is directly locked on the base frame with a thread at one end to form a fixed structure so that it is not easy to disassemble and cause inconvenience in storage. Although an arm with a roller is able to fold, the structure is too complicated to easily assemble.

BRIEF SUMMARY OF THE INVENTION

The primary objective of the present invention is to provide a tire assembly and disassembly auxiliary device that is capable of swinging the handle to multiple positions to move and raise tires for greater convenience of use.

To achieve the above objective, the present invention provides a tire assembly and disassembly auxiliary device that includes a base frame for loading a tire, a handle and a restricting member. The base frame includes a main bar member extending in a longitudinal direction and two branch bar members. The main bar member is pivotally connected with a joint member capable of rotating about an imaginary axis which is parallel to the longitudinal direction. Each of the branch bar members is provided with a front shaft seat at an end, a rear shaft seat having a rear wheel at an opposite end and a rotatable roller between the front shaft seat and the rear shaft seat. Each of the rear shaft seats is provided with a connecting member capable of movably connecting to the main bar member and is selectively fixed to the main bar member through a positioning member. The handle has an end portion connected with the joint member in order to pivot relative to the main bar member via the joint member. The restricting member selectively connects with the handle and the main bar member in order to fix the handle relative to the main bar member.

Preferably, each of two ends of the main bar member is provided with a cover plate connected with one said joint member having a sleeve portion. The handle has two said end portions each correspondingly inserting in one said sleeve portion.

Preferably, each of the cover plates is provided with an opening. A shaft, extending along the imaginary axis, disposed on each of the sleeve portions is assembled within the opening.

Preferably, each of the openings reaches a periphery of the corresponding cover plate. Each of the openings includes a receiving portion and a narrowing portion. Each of the shafts has a neck portion, positioned by the narrowing portion, received in the receiving portion and a stop portion with a diameter greater than that of the receiving portion.

Preferably, each of the end portions of the handle is provided with a first elastic fastener and a second elastic fastener. The first elastic fastener normally penetrates into a first positioning hole of the corresponding sleeve portions in order to fix the handle to the joint member. The second elastic fastener normally penetrates into a second positioning hole of the corresponding restricting members when the restricting member is connected to the main bar member in order to fix the restricting member to the handle. Each of the end portions is movably connected with one said restricting member capable of moving along the corresponding end portion to a lock position where the restricting member, the handle and the main bar member are locked together.

Preferably, the main bar member is a square column with two opposite first surfaces and two opposite second surfaces perpendicular to the first surfaces. The restricting member has two opposite skirt plates to selectively abut against the first surfaces or the second surfaces in order to fix the handle relative to the main bar member when the restricting member is connected to the main bar member.

Preferably, each of the front shaft seats is provided with a front wheel.

Preferably, the connecting member is ring-shaped and encircles the main bar member. The connecting member is provided with a screw hole. The positioning member is a bolt disposed in the screw hole to abut against the main bar member.

Preferably, a tire supporting wheel is disposed between the two branch bar members on the main bar member.

DETAILED DESCRIPTION OF THE INVENTION

Figure 1:
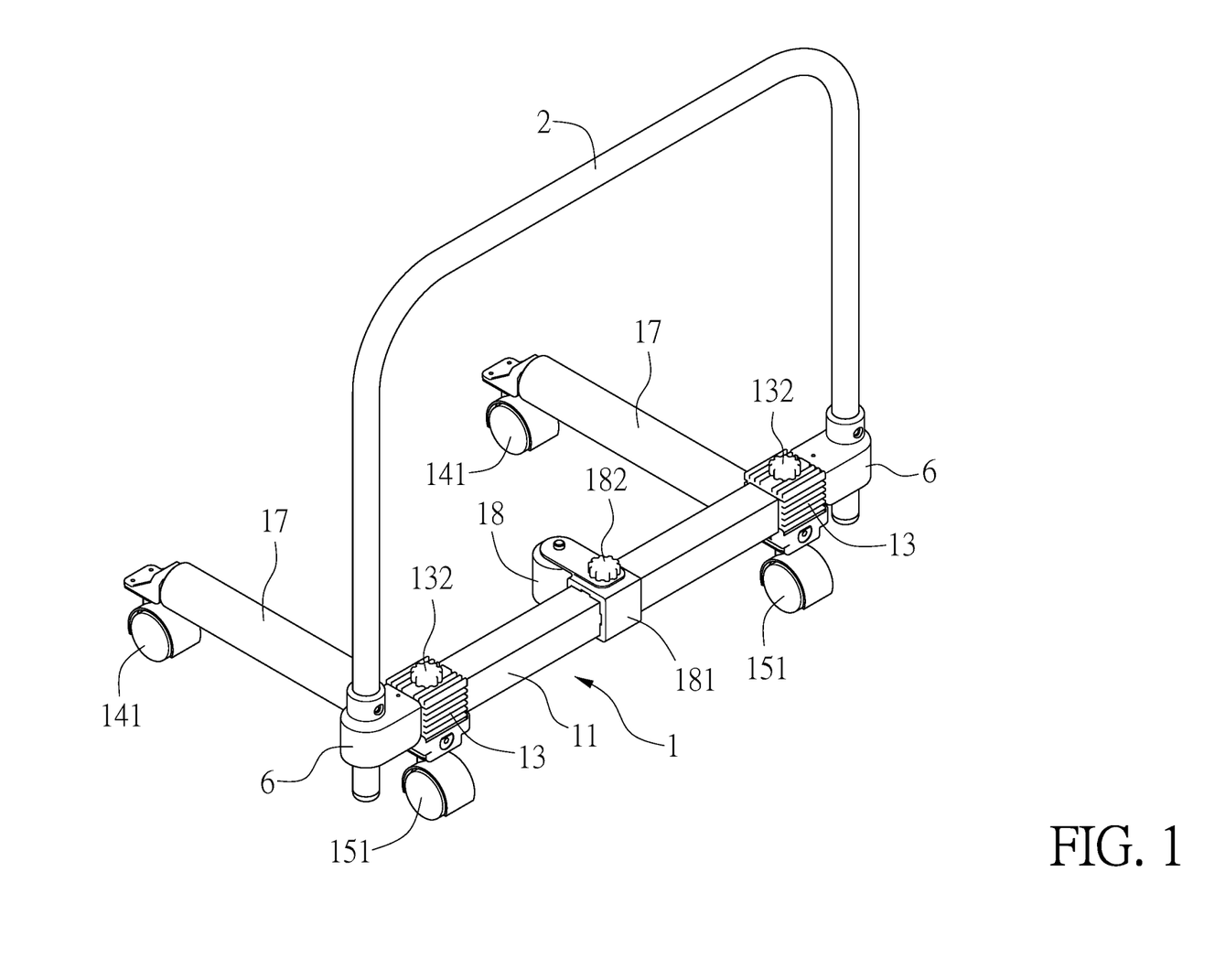
FIG. 1 is a perspective view of the present invention.
Figure 2:
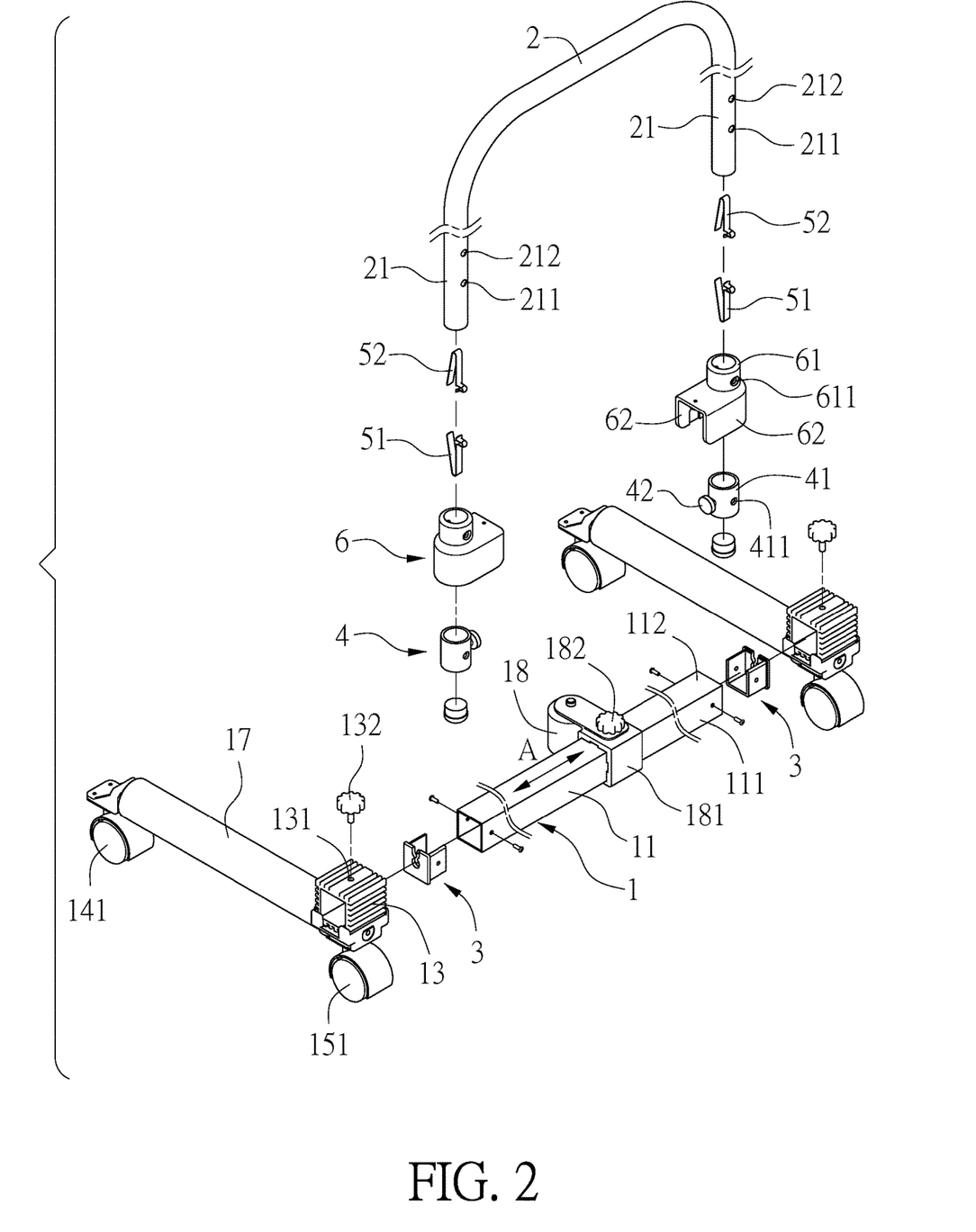
FIG. 2 and FIG. 3 are exploded perspective views of the present invention.
Figure 3:
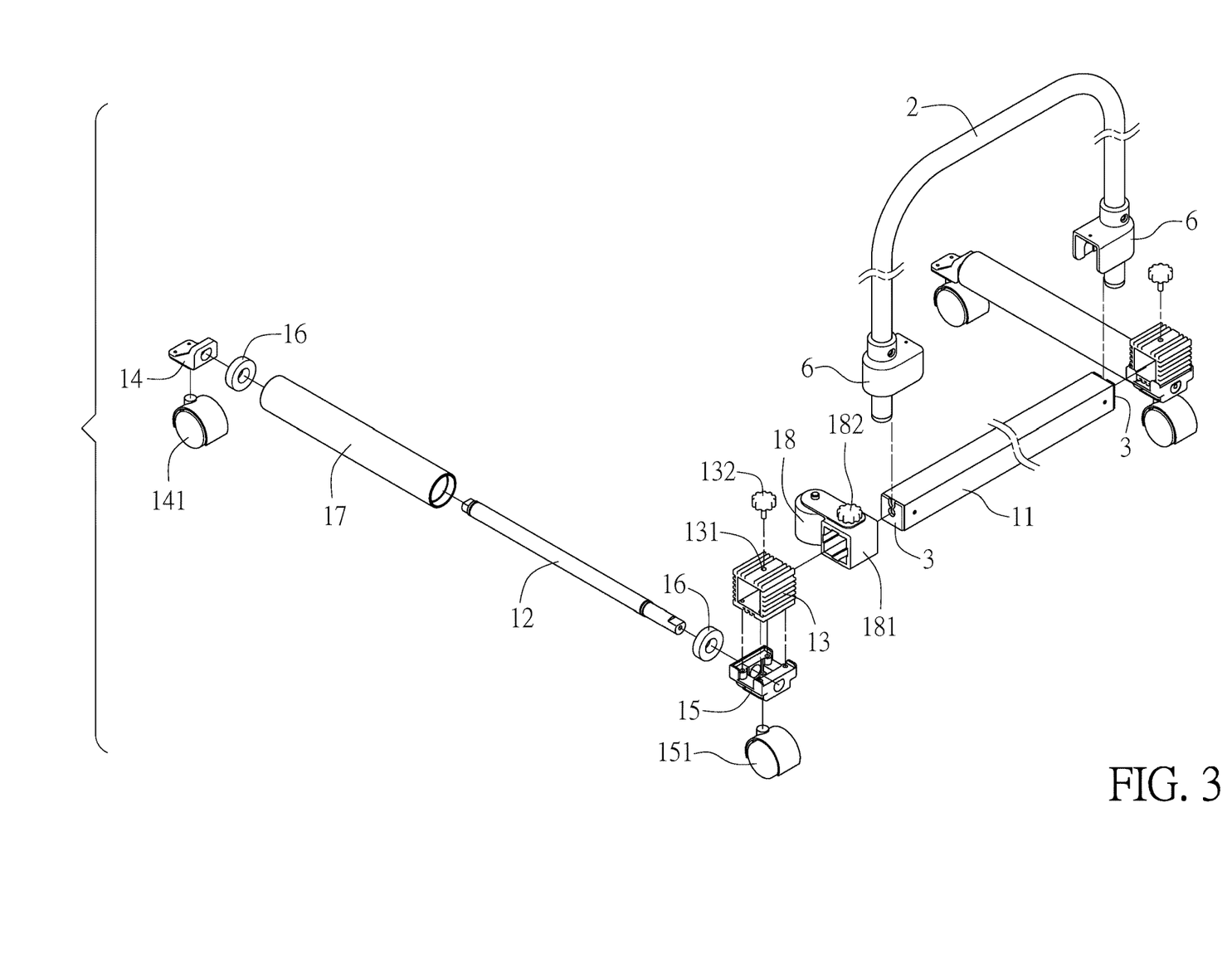

Referring to FIG. 1, FIG. 2 and FIG. 3, the tire assembly and disassembly auxiliary device according to the present invention includes a base frame 1 for loading a tire and a handle 2. The base frame 1 includes a main bar member 11 extending in a longitudinal direction A and two branch bar members 12. Each of the branch bar members 12 is movably connected to the main bar member 11 via a connecting member 13 which is selectively fixed on a selected position of the main bar member 11 by a positioning member so that a distance between the two branch bar members 12 is adjustable. In this embodiment, the main bar member 11 is formed as a square column while the connecting members 13 are formed in a shape of a square ring to encircle the main bar member 11. The positioning member is a bolt 132 disposed in a screw hole 131 of the connecting member 13 to abut against the main bar member 11, forcing the connecting member 13 to abut against the main bar member 11 tightly so that the branch bar member 12 is fixed.

Each of the branch bar members 12 is provided with a front shaft seat 14 at an end and a rear shaft seat 15 at an opposite end. The connecting member 13 abovementioned is fixed on the rear shaft seat 15. Each of the front shaft seat 14 and the rear shaft seat 15 is provided with a bearing 16. A roller 17 is rotatably connected with the two bearings 16 and is capable of rotating on the branch bar member 12. Additionally, a front wheel 141 is disposed on the bottom of the front shaft seat 14 while a rear wheel 151 is disposed on the bottom of the rear shaft seat 15.

Each of two ends of the main bar member 11 is provided with a cover plate 3 connected with a joint member 4. Each of the joint members 4 includes a sleeve portion 41 with a shaft 42, composed of a neck portion 421 and a stop portion 422 with a greater diameter than the neck portion 421, extending along an imaginary axis which is parallel to the longitudinal direction A. The neck portion 421 is connected to the sleeve portion 41 while the stop portion 422 is connected to a terminal of the neck portion 421. Each of the cover plates 3 is provided with an opening 31 reaching a periphery of the corresponding cover plate 3 to form a passageway for the shaft 42 to enter. The opening 31 includes a receiving portion 311 with an equal diameter to the neck portion 421 and a narrowing portion 312 which narrows the passageway to an extent that the width is less than that of the receiving portion 311.

Figure 4:
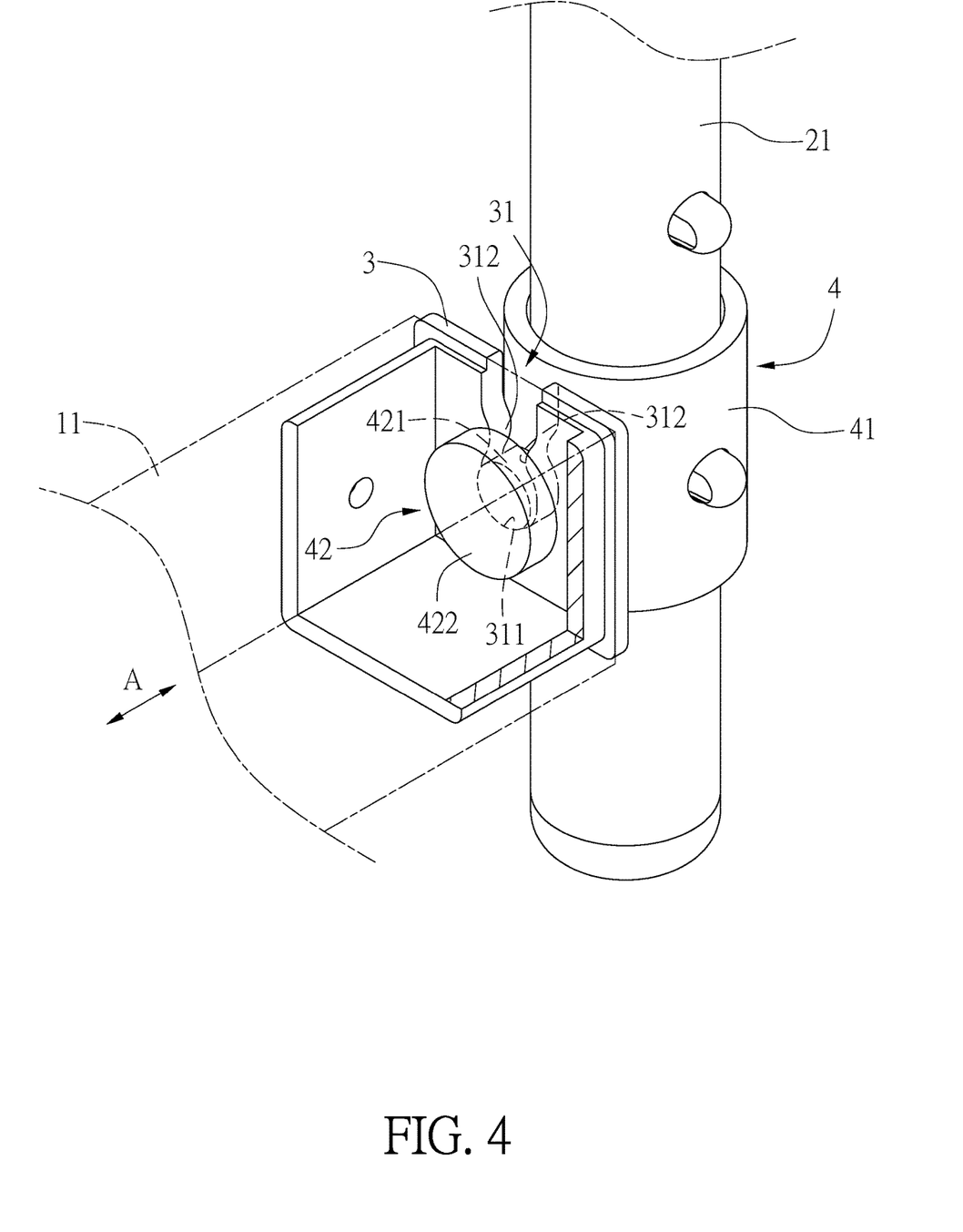
FIG. 4 is a perspective view of a joint of the handle and the base frame of the present invention.

The neck portion 421, as shown in FIG. 4, in the opening 31, passes the narrowing portion 312 and enters the receiving portion 311, and then the neck portion 421 is restricted in the receiving portion 311 by the narrowing portion 312 with the sleeve portion 41 being outside of the cover plate 3 and the stop portion 422 being inside of the cover plate 3. The joint member 4 is kept from leaving the cover plate 3 as a result of the stop portion 422 being stopped by the cover plate 3. Accordingly, the joint member 4 is capable of rotating about the shaft 42 relative to the main bar member 11.

Figure 5:
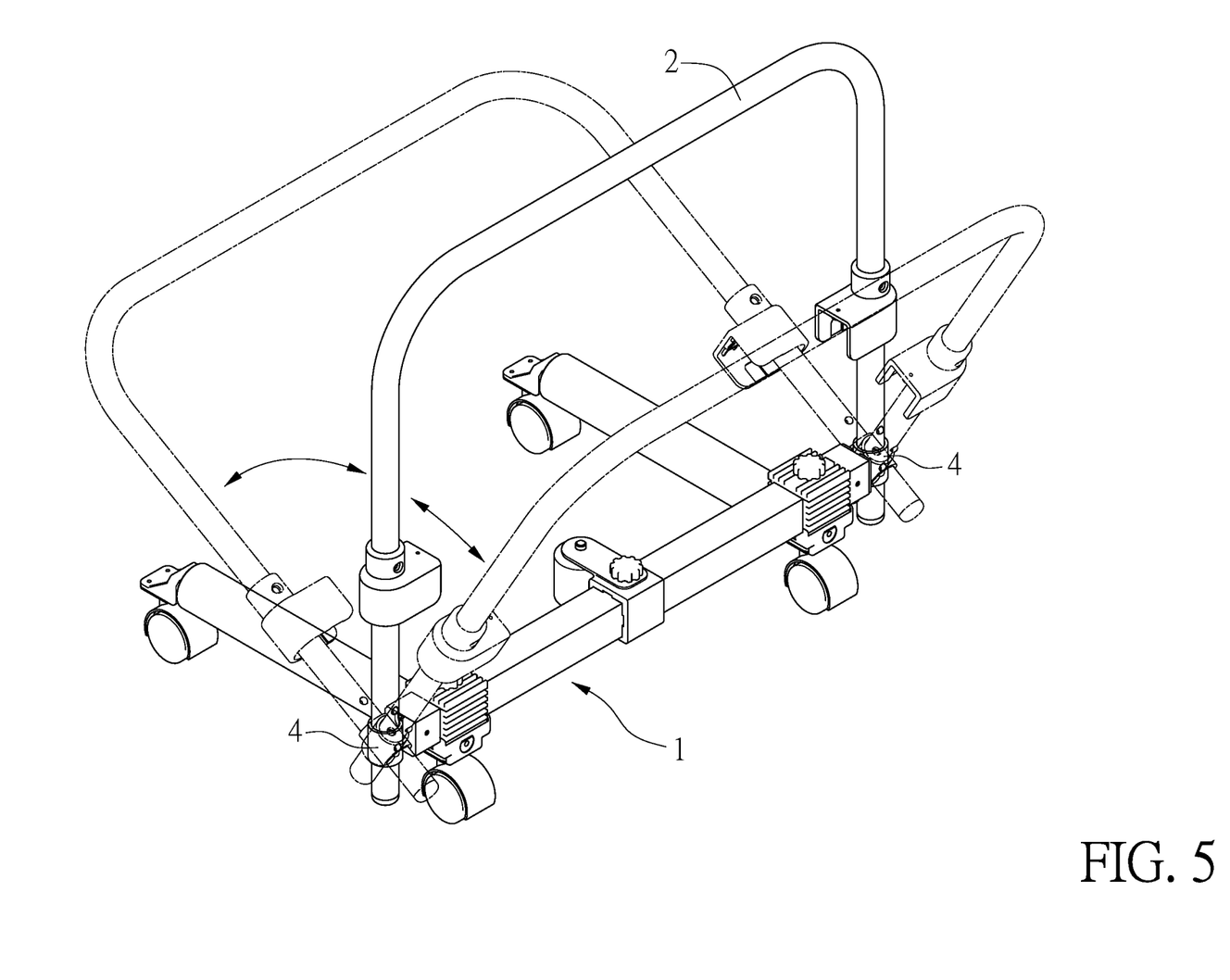
FIG. 5 shows how the handle pivots relative to the base frame.
Figure 6:
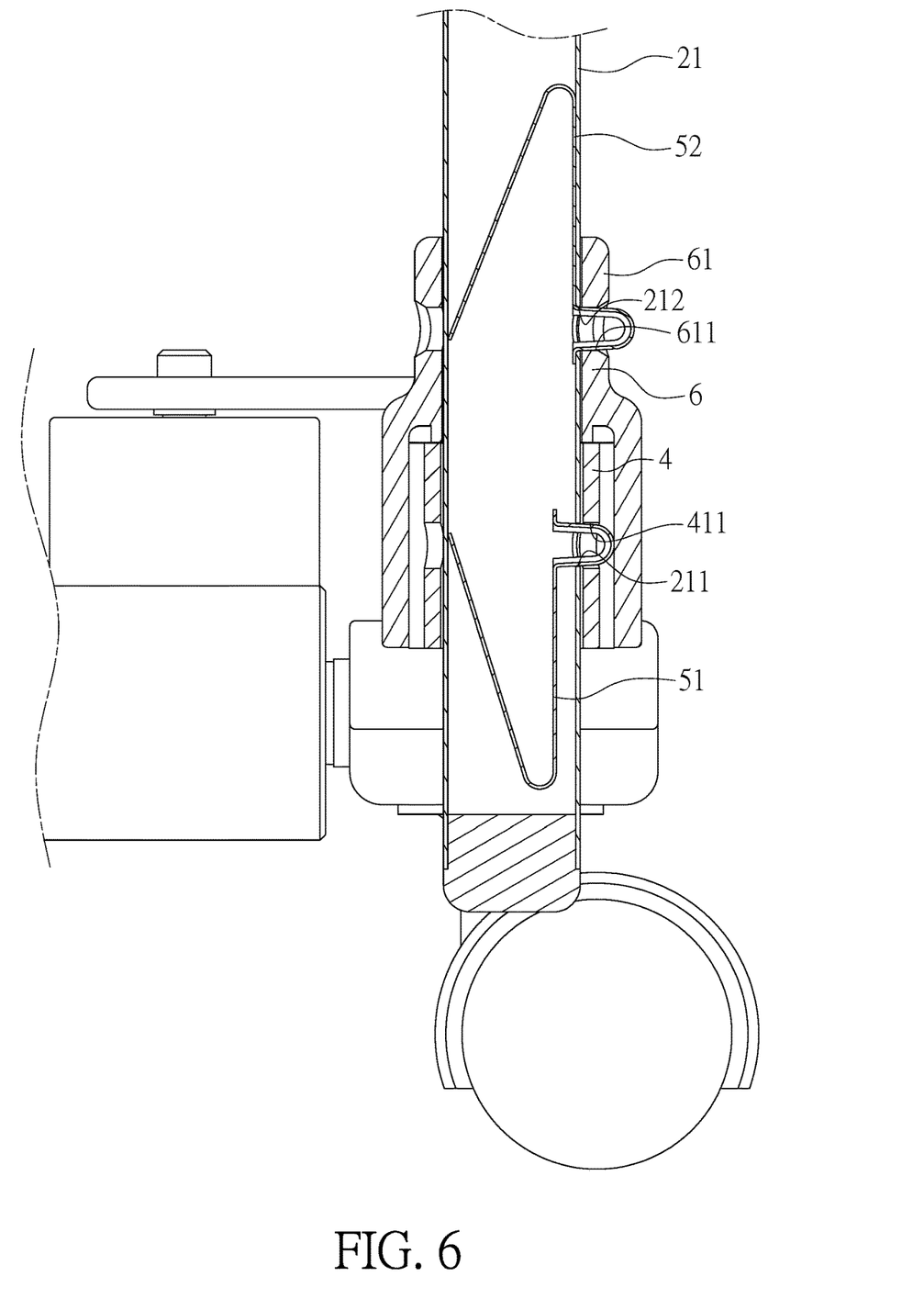
FIG. 6 is a sectional view of a joint of the handle, the joint member and the restricting member.

The handle 2 is U-shaped and has two end portions 21 each correspondingly inserting in one sleeve portion 41 so as to swing relative to the base frame 1 via the joint member 4 as shown in FIG. 5. Referring to FIG. 6, each of the end portions 21 of the handle 2 is hollow and a first elastic fastener 51 is disposed therein. The first elastic fastener 51 normally protrudes from a surface of the end portion 21 through a first through hole 211. The sleeve portion 41 is provided with a first positioning hole 411. In course of the end portion 21 inserting into the sleeve portion 41, the first elastic fastener 51 may penetrate into the first positioning hole 411 as long as the first through hole 211 is aligned with the first positioning hole 411 so that the handle 2 is fixed to the joint member 4.

Each of two end portions 21 is provided with a restricting member 6 capable of moving along the handle 2 and being positioned at a lock position. Referring to FIG. 6, a second elastic fastener 52 is disposed inside the end portion 21 and normally protrudes from the surface of the end portion 21 through a second through hole 212. The restricting member 6 includes a sleeve portion 61 movably connected to the end portion 21. A second positioning hole 611 is disposed on the sleeve portion 61. In course of the restricting member 6 reaching the lock position, the second elastic fastener 52 may penetrate into the second positioning hole 611 as long as the second through hole 212 is aligned with the second positioning hole 611 so that the restricting member 6 is positioned.

Each of the restricting members 6 has two opposite skirt plates 62. The square main bar member 11 has two opposite first surfaces 111 and two opposite second surfaces 112 perpendicular to the first surfaces 111. When the handle 2 is arranged in cases that the skirt plates 62 are parallel to the first surfaces 111 or the second surfaces 112, the restricting member 6 is able to be pushed forwardly along the end portion 21 toward the main bar member 11 and reaches the lock position. Then the two skirt plates 62 abut against the first surfaces 111 or the second surfaces 112 in order to fix the handle 2 relative to the main bar member 11, restricting the handle 2 from swinging.

Figure 7:
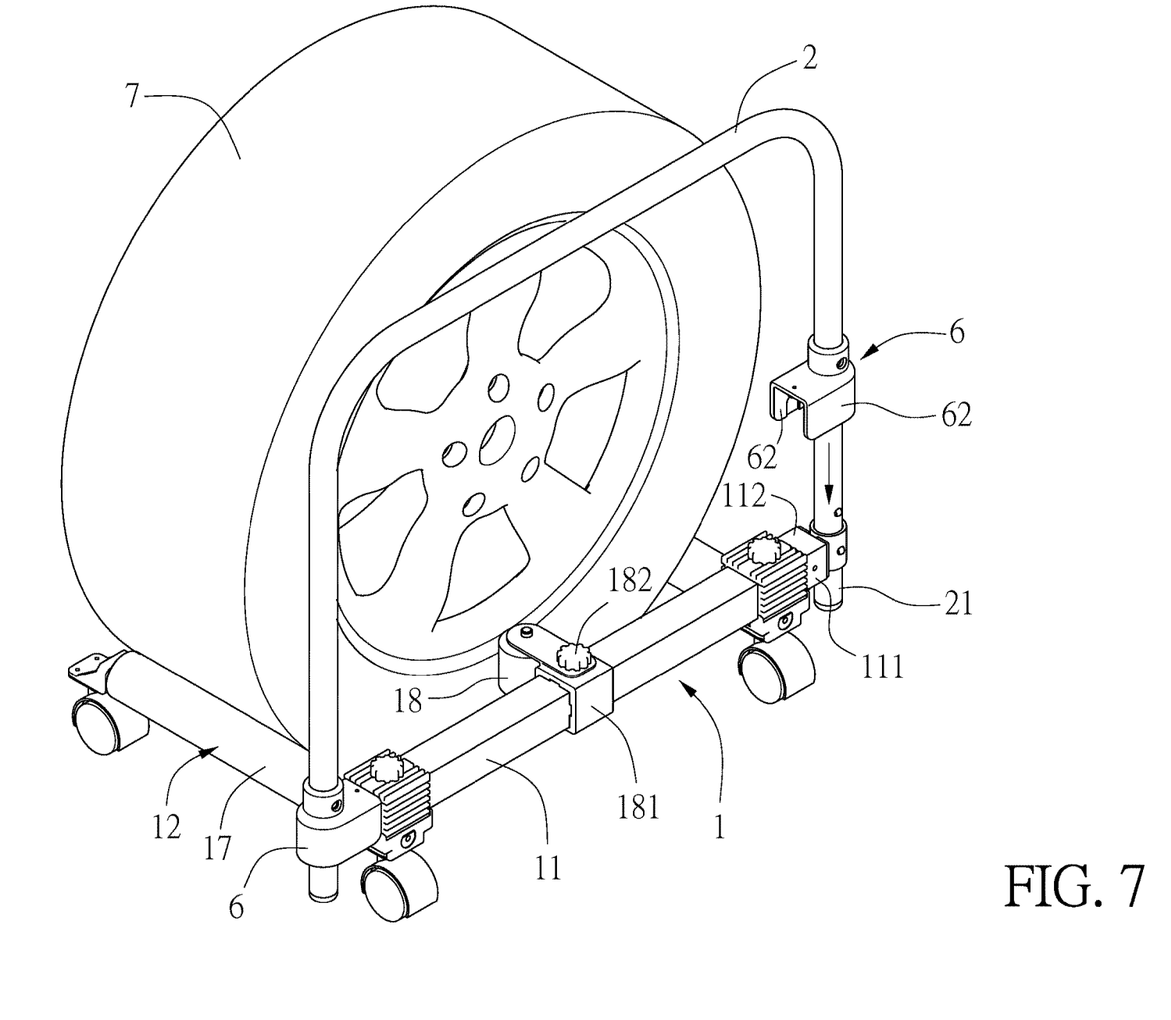
FIGS. 7, 8, 9 and 10 are perspective views of the present invention when in use.

In one case of tire transportation, the handle 2, as shown in FIG. 7, is arranged to be perpendicular to the base frame 1 so that the two skirt plates 62 are parallel to the first surfaces 111. At this time, the restricting member 6 is able to be pushed forwardly along the end portion 21 to reach the lock position, and then the two skirt plates 62 abut against the first surfaces 111 in order to fix the handle 2. Tires 7 put on the base frame 1, accordingly, are transported by pushing or pulling the handle 2 and are capable of rotating via the rollers 17 to change its orientation. A tire supporting wheel 18 for assistance in tire rotation is disposed between the two branch bar members 12 on the main bar member 11. The tire supporting wheel 18 includes a ring portion 181 encircling the main bar member 11 and a screw 182 penetrating the ring portion 181 to abut against the main bar member 11 for positioning.

Figure 8:
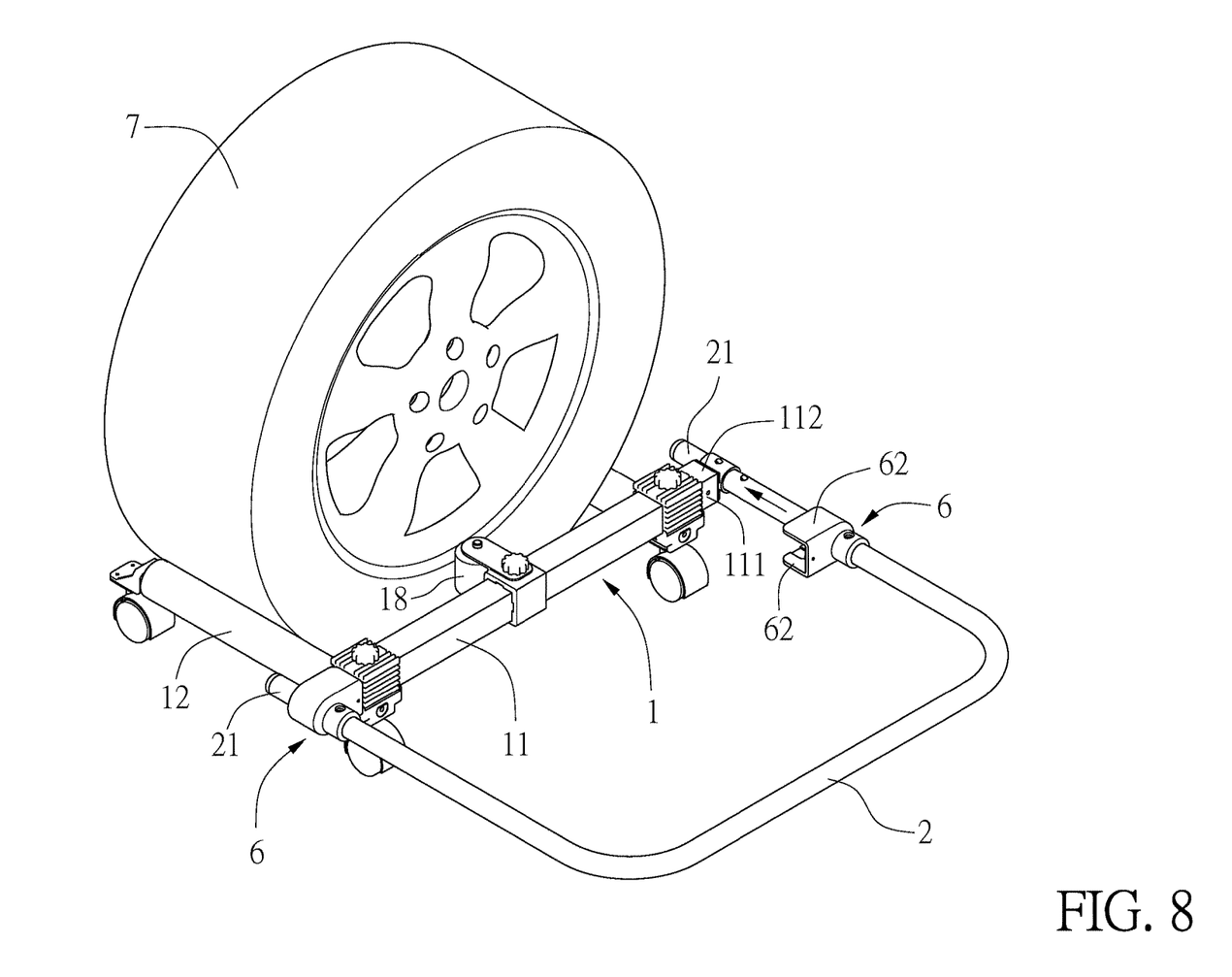

In one case of tire assembly, the handle 2, as shown in FIG. 8, is arranged to be parallel to the base frame 1 and be opposite to the branch bar members 12 so that the two skirt plates 62 are parallel to the second surfaces 112. At this time, the restricting member 6 is able to be pushed forwardly along the end portion 21 to reach the lock position, and then the two skirt plates 62 abut against the second surfaces 112 in order to fix the handle 2. Tires 7 put on the base frame 1, accordingly, are able to be lifted by pulling the handle 2 upwardly for assembling.

Figure 9:
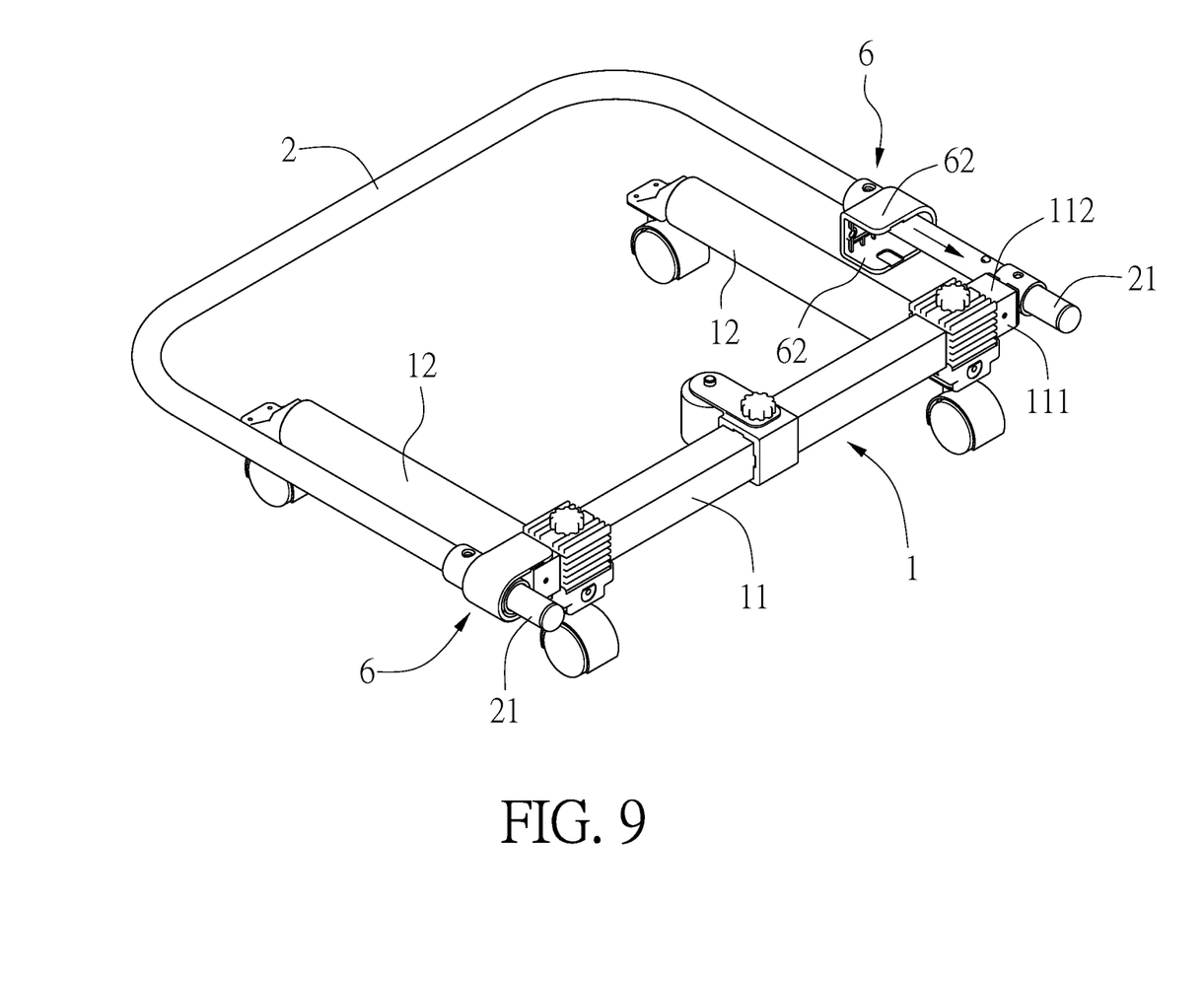

Moreover, in one case of storage, the handle 2, as shown in FIG. 9, is arranged to be parallel to the base frame 1 and be in the same direction as the branch bar members 12 so that the two skirt plates 62 are parallel to the second surfaces 112. At this time, the restricting member 6 is able to be pushed forwardly along the end portion 21 to reach the lock position, and then the two skirt plates 62 abut against the second surfaces 112 in order to fix the handle 2. An overall volume, accordingly, can be reduced to facilitate storage.

In each of the cases abovementioned, after the handle 2 is arranged in specific orientations, the restricting member 6, the handle 2 and the main bar member 11 are locked together when the restricting member 6 is pushed along the end portion 21 to the lock position so that the handle 2 is easily fixed.

Figure 10:
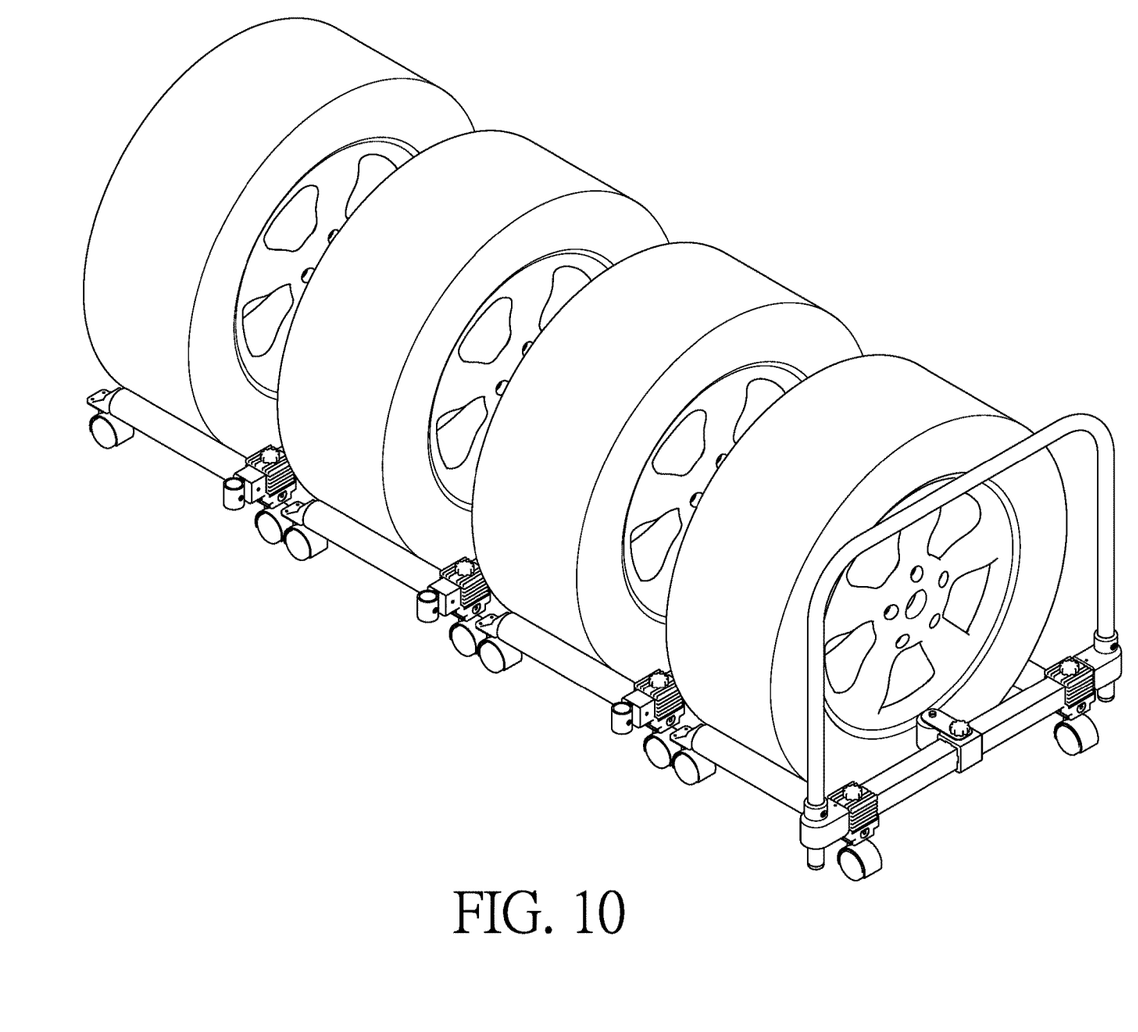

In another case of use, tires, as shown in FIG. 10, may separately be stored with a plurality of the devices of the present invention. The devices can easily be aligned into a straight line due to the suitability for side-by-side arrangement. The handle 2 may be removed for other use.

What is claimed is:

1. A tire assembly and disassembly auxiliary device comprising:
   a base frame for loading a tire including a main bar member extending in a longitudinal direction and two branch bar members, the main bar member being pivotally connected with a joint member capable of rotating about an imaginary axis which is parallel to the longitudinal direction, each of the branch bar members being provided with a front shaft seat at an end, a rear shaft seat having a rear wheel at an opposite end and a rotatable roller between the front shaft seat and the rear shaft seat, each of the rear shaft seats being provided with a connecting member capable of movably connecting to the main bar member and being selectively fixed to the main bar member through a positioning member;

a handle having an end portion connected with the joint member in order to pivot relative to the main bar member via the joint member; and a restricting member selectively connected with the handle and the main bar member in order to fix the handle relative to the main bar member.

2. The tire assembly and disassembly auxiliary device of claim 1, wherein each of two ends of the main bar member is provided with a cover plate connected with one said joint member having a sleeve portion, and the handle has two said end portions each correspondingly inserting in one said sleeve portion.

3. The tire assembly and disassembly auxiliary device of claim 2, wherein each of the cover plates is provided with an opening, and a shaft, extending along the imaginary axis, disposed on each of the sleeve portions is assembled within the opening.

4. The tire assembly and disassembly auxiliary device of claim 3, wherein each of the openings reaches a periphery of the corresponding cover plate, and each of the openings includes a receiving portion and a narrowing portion; each of the shafts has a neck portion, positioned by the narrowing portion, received in the receiving portion and a stop portion with a diameter greater than that of the receiving portion.

5. The tire assembly and disassembly auxiliary device of claim 2, wherein each of the end portions of the handle is provided with a first elastic fastener normally penetrating into a first positioning hole of the corresponding sleeve portions in order to fix the handle to the joint member.

6. The tire assembly and disassembly auxiliary device of claim 2, wherein each of the end portions of the handle is provided with a second elastic fastener normally penetrating into a second positioning hole of the corresponding restricting members when the restricting member is connected to the main bar member in order to fix the restricting member to the handle.

7. The tire assembly and disassembly auxiliary device of claim 2, wherein each of the end portions of the handle is provided with a first elastic fastener and a second elastic fastener, the first elastic fastener normally penetrating into a first positioning hole of the corresponding sleeve portions in order to fix the handle to the joint member, the second elastic fastener normally penetrating into a second positioning hole of the corresponding restricting members when the restricting member is connected to the main bar member in order to fix the restricting member to the handle; each of the end portions is movably connected with one said restricting member capable of moving along the corresponding end portion to a lock position where the restricting member, the handle and the main bar member are locked together.

8. The tire assembly and disassembly auxiliary device of claim 2, wherein the main bar member is a square column with two opposite first surfaces and two opposite second surfaces perpendicular to the first surfaces; the restricting member has two opposite skirt plates to selectively abut against the first surfaces or the second surfaces in order to fix the handle relative to the main bar member when the restricting member is connected to the main bar member.

9. The tire assembly and disassembly auxiliary device of claim 2, wherein each of the front shaft seats is provided with a front wheel.

10. The tire assembly and disassembly auxiliary device of claim 2, wherein the connecting member is ring-shaped and encircles the main bar member; the connecting member is provided with a screw hole, and the positioning member is a bolt disposed in the screw hole to abut against the main bar member.

11. The tire assembly and disassembly auxiliary device of claim 2, wherein a tire supporting wheel is disposed between the two branch bar members on the main bar member.

* * * * *